Sept. 15, 1970 R. KENEDI 3,529,092

LINE CIRCUIT

Filed Oct. 3, 1966

INVENTOR.
ROBERT KENEDI

BY Westell & Hanley 3,529,092
LINE CIRCUIT
Robert Kenedi, Ottawa, Ontario, Canada, assignor to Northern Electric Company Limited, Montreal, Quebec, Canada
Filed Oct. 3, 1966, Ser. No. 583,844
Int. Cl. H04q *3/18*
U.S. Cl. 179—18 2 Claims

ABSTRACT OF THE DISCLOSURE

Circuitry detects the change of potential on a line of an automatic telephone switching system when a circuit is closed through a sub-set connected to that line, differentiates the change of potential to provide a pulse, applies the pulse to create one binary state in a destructive read-out memory element, a scan pulse detects the existence of such binary state and returns the element to the other binary state.

This invention relates to line scanning techniques for automatic telephone switching where the need for connection of a sub-set to another sub-set is signalled by a change of potential on the sub-set line.

This invention deals with telephone circuitry wherein the fact that a sub-set is in need of connection (usually arising through the lifting of the hand-set and the operation of the hook-switch) is signalled by a change of potential on the sub-set line.

At the present time the need of such sub-set line for switching or service is detected by having connected a relay or equivalent device which is operated by the changed potential and hence reflects the potential state of the sub-set line. The potential state of a line requiring switching is sometimes referred to hereafter as the "ready" state. The lines are then periodically scanned and a line in the "ready" state, i.e. needing switching is detected and responsive to such detection the necessary detection operations are initiated. However with prior devices, as so far described, the difficulty has arisen that, once a scan pulse has detected the state, indicating the need for switching, the succeeding scan will (assuming the continued ready state indication by the sub-set relay) repeat such detection. On the other hand, the line state indicating relay cannot conveniently be disconnected on detection by the first "scan" since undesirable clicks are caused by such disconnection in the sub-set line. Previously therefore, on detection of line state by the first scan the known method would avoid the problem of subsequent re-detections in one of three ways:

(1) By stopping the scanner.

(2) By comparing state of sub-set line at present scan, with state of sub-set line at previous scan, and initiating the service only if a change in consecutive scans from "off" state to "ready" state is noted.

(3) Each scan re-detects previously detected lines, still at ready potential. However all detections are compared with lines then being served and only those which do not correspond to lines being served are processed.

To solve the problem in any of the above three ways, requires special control logic in the sense of extra equipment or programming adding greatly to equipment complexity and cost.

This invention provides means which avoid the disadvantages just mentioned without requiring the addition of special control logic.

The invention provides means for differentiating the change of potential on the sub-set line when it moves to "ready" state thereby producing therefrom, a pulse; means for recording the existence of such pulse by "setting" a destructive read-out memory element (i.e. causing it to switch from a second to a first of two binary states), means for periodicelly scanning said memory and for detecting a memory in such first state, whereby the switching required for the sub-set line may be initiated. The fact that the memory is of the destructive read-out type, ensures that the switching operation is initiated only once for each change of a sub-set line from "off" to "ready" and this characteristic together with the fact that the memory is actuated by change of potential rather than poential state, eliminates the need for logic circuitry.

Thus the "second state" of the memory element (commonly known as "RESET") is the quiescent state before the core is switched by the change of potential in the subset line. Switching the last-mentioned pulse produces the "first state" in the memory element (commonly known as "SET").

While a ferrite core is here specified as the destructive read-out memory element, it should be realized that any other destructive read-out memory element may be used. Whatever destructive read-out memory element is used will be connected in accord with its characteristics to be caused to assume the first of two binary states by the pulse resulting from the differentiation; scanned; and destructively read-out in manners well known to those skilled in the art. The destructive read-out will therefore cause the memory elements to switch to the first binary state. As examples only it will be noted that magnetic tape or thin film destructive read-out memories could be used although these are not believed to be as practical in most applications as ferrite cores.

In drawings which illustrate a preferred embodiment of the invention:

Figure 1:
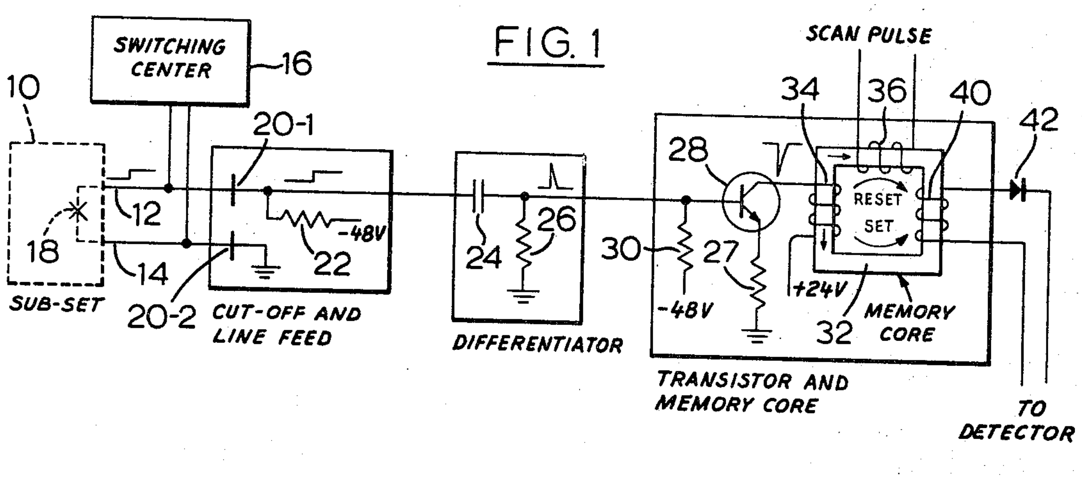
FIG. 1 shows a circuit for carrying out the invention.
Figure 2:
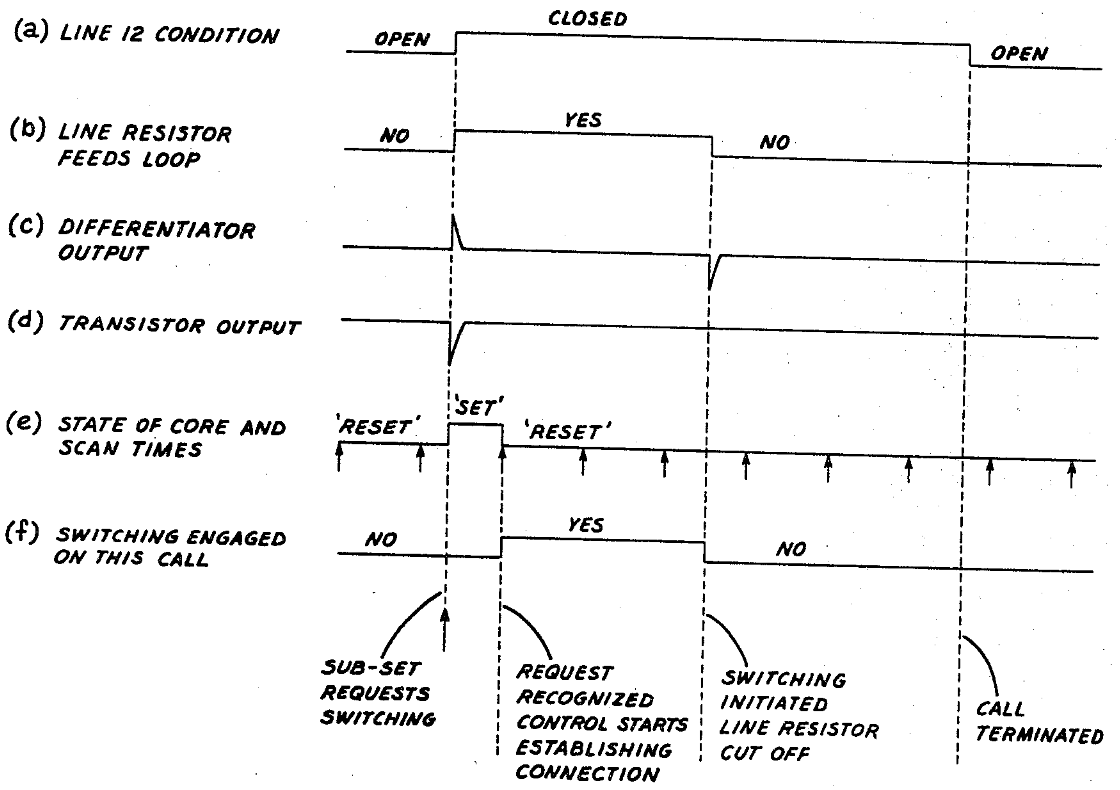
FIG. 2 shows the variation in state of certain portions of the circuitry with time.

In the drawings: a sub-set or subscribers set 10 is shown connected to wires 12 and 14 which connect the sub-set to a switching centre 16 for connection to other sub-sets or to a central office.

Since the bulk of the wiring and mechanism of sub-set 10 and switching centre 16 is of no interest to the description of this invention, this is in substance omitted and it is merely indicated schematically that, in the sub-set, a switch 18 commonly called a "hoook-switch" is closable to connect lines 12 and 14. The switch 18 is arranged so that when the hand-set is raised (or equivalent action taken) to initiate a call, the switch 18 is closed and remains closed until the call is completed. At other times, the switch 18 is open.

Line 14 in addition to connection between the sub-set and the switching centre 16 is connected to ground through the normally closed contacts 20–2 of a cut-off relay which is not shown, but is discussed hereinafter.

Line 12 in addition to connection between the sub-set and the switching centre 16 is connected to a potential source, here —48 volts through the normally closed contacts 20–1 of the aforesaid cut-off relay and a line resistor 22 in series with each other.

Contacts 20–1 on the side electrically remote from the line 12 are connected through condenser 24 and resistor 26 to ground. Condenser 24 and resistor 26 are designed to operate as a differentiating circuit and the junction between the condenser and resistor is connected to the base of a transistor 28. The base of transistor 28 is also connected to a —48 volt source through a resistor 30. The emitter of transistor 28 is connected through resistor 27 to ground.

The transistor 28 is shown as being of the NPN type, but it will be appreciated that the functions thereof could be performed by a PNP transistor with appropriate and well known wiring and biasing changes.

The collector of transistor 28 is connected to the "SET" winding 34 of a ferrite core 32 and through such winding to a voltage source—here +24 volts. The core is designed to assume a first state after switching by a pulse from set winding 34 and a second state when last switched by a pulse in the opposite sense to that provided by set winding 34. The transistor is biased to be non-conducting during the absence of a signal from condenser 24.

A "scan" winding 36 is also located on ferrite core 32 and is actuable to provide periodic scan pulses by a source of such pulses. Although only one memory core is shown it will be understood that the invention envisages a large number of these, each corresponding to a sub-set and to differentiating and transistor circuitry similar to that shown and that such cores will be simultaneously and/or sequentially periodically scanned.

A sense winding 40 is also associated with the core 32 for providing on an output signal when the core alters its state from its first to its second state to actuate a detector whereby on detection the necessary switching may be performed at centre 16 for sub-set 10. It will be understood that the design of such ferrite core will be related to the design of the detection means so that unwanted impulses on the sense winding 40 are of much less value than impulses which it is desired to detect and hence the detector may easily ignore the former and detect the latter. The impulses on output winding 40 due to scan pulses when core 32 is in the second state will be small in magnitude and will be ignored by the detector. The pulse produced by the change of the core from second to first state is prevented by placing a rectifier 42 between the sense winding 40 and whatever detection means is used the rectifier 42 therefore being poled to pass the pulse on transition to second state and to block the pulse of transition to first state. The detection circuitry will therefore be designed to ignore the results of scan pulses on the second state core but to detect the large impulse which will occur on winding 40 when the core is returned to second state by the incidence of a scanning pulse.

Many cores are operable in accord with the above criteria. One which has been used in this way is the Type TMSO6–15 ferrite memory core produced by Telemeter Magnetics Inc., 2245 Pontius Ave., Los Angeles, 64, Calif. With this core the "SET" winding circuit will be designed to provide 350 ma./turns and the scan winding circuit 350 ma./turns of the opposite polarity. With such arrangement the output as a result of a scan pulse is about 5 millivolts with the core previously in the second state and about 55 millivolts with the core previously in the first state.

In the operation of the invention, with the sub-set out of use, the hook switch 18 is open, contacts 20–1 and 20–2 are closed, line 12 is at —48 volts through the negative source connected to resistor 22 and corresponds to the initial, left hand "open" portion graph 2(a). Line 14 is at ground potential condenser 24 is at —48 volts on the side connected to line 12 and near ground potential on the side connected to the base of transistor 28, since resistor 30 is of much greater value than resistor 26.

The magnetic core 32 is in the second state which, as previously discussed is a scheduled magnetic state indicated as the zero level at the left and the right of graph 2(e). Scan pulses are being periodically impressed by winding 36 as indicated by the vertical arrows on graph 2(e). Due to the core being in the second state, these produce low level outputs on winding 40 and which the detection apparatus will be designed to ignore (such low level outputs, produced with the care in the second state are therefore not shown on the graph).

When hook switch 18 is closed indicating that the substation is to be switched (usually by lifting the hand set); the line 12 between contacts 20–1 and the condenser changes in potential from —48 volts to near ground potential. The condenser 24 and line resistor 26 act to differentiate this change of potential, and to produce, at the junction of condenser 24 and resistor 26, a pulse (see the left hand pulse of graph 2(c)).

The design of the circuit values of resistances 30 and 26 and 22, and of the capacitor 24 are arranged so that the positive going pulse graph 2(c) is sufficient, over at least a portion of its duration, to cause transistor to conduct producing from the positive going pulse the output pulse therefrom shown at graph 2(d), which in accord with the selecteion of element values, is sufficient to switch the core 32 to the first state, see graph 2(e). After the cessation of the differentiation output pulse, condenser 24 then discharges through resistor 26 and as this takes place, transistor 28 is again cut off.

As previously stated rectifier 42 is poled so that the detecting circuit will not receive any signal resulting at the sense winding 40 from the setting of the core 32.

Also as previously stated and as shown in graph 2(e) scan pulses will have been applied to the core while still in the second state without substantial effect on the sense winding or detection means.

However upon the occurrence of the first scan pulse after the core is "SET" switched to the first state (see the third scan pulse from the left in graph 2(e)), the core is switched to the second state and the pulse from such change is sufficient to activate the detection means.

Since the core is switched to the second state by the third pulse it is noted that signals in sense winding resulting from subsequent scan pulses will be much smaller than that resulting when the core switches to the second state, so that there is no necessity of stopping the scan and thus it is not necessary to stop the scan.

Graph 2(f) indicates that through circuitry not shown, but well known in the telephone art as a result of the detected signal from sense winding 40 the service request (embodied in the pulse resulting from switching the core to the second state) is recognized and that switching at switching centre 16 is initiated. As a result the cut-off relay not shown, but whose operation is well known to those skilled in the art, is actuated as a result of operations by the switching centre 16 to open the contacts 20–1, 20–2 and disconnect the line resistance 22 and —48 volt source from line 12. The opening of contacts 20–1, causes the recharging of condenser 24. Although this results in a negative pulse from the differentiating circuit to the base of transistor 28 (see graph 2(c)), there is no result at the collector of the transistor 28 (see graph 2(d)) since the transistor is already cut off and the negative pulse merely enhances this condition.

Although the "SET," "scan" and "sense" windings are separately designated it is intended to include within the scope of the disclosure and claims, the situation where because of exterior circuit design a winding performs two or more of the above functions.

It will also be noted that transistor 28 serves a twofold purpose, to amplify pulses in one sense from the differentiator and to reject pulses from the differentiator in the other sense. It will therefore be obvious that within the scope of the invention, the transistor may be dispensed with and subtituted for in any application where the amplification of the differentiator pulse in the desired sense may be dispensed with or is performed in another manner and where the differentiator pulses of the undesired sense are blocked in another manner.

I claim:

1. Means responsive to change of potential in a line to initiate an operation comprising:
- means for differentiating the change of potential on the said line;
- and for producing therefrom, a pulse,
- a destructive read-out memory element designed to assume a first and a second state;
- means for utilizing such pulse to cause said destructive read-out memory to assume a first state;
- means for periodically scanning said memory, detecting said first state and thereupon switching said memory element to a second state.

2. Means as claimed in claim 1 wherein said line is the line to a telephone sub-set and the operation is switching for said line.

References Cited

UNITED STATES PATENTS

| | | | |
|---|---|---|---|
| 3,157,746 | 11/1964 | Lowry. | |
| 3,491,212 | 1/1970 | Gagnier. | |
| 3,172,958 | 3/1965 | Williford | 179—18.3 |
| 3,231,683 | 1/1966 | Lowry et al. | 179—18.3 |
| 3,412,210 | 11/1968 | Edestrom. | |

WILLIAM C. COOPER, Primary Examiner